United States Patent [19]

Goldmann et al.

[11] Patent Number: 4,684,214
[45] Date of Patent: Aug. 4, 1987

[54] CABLE WITH A FRICTION REDUCING OUTSIDE LAYER

[75] Inventors: Horst Goldmann, Woerthsee; Ernst Mayr, Starnberg; Ulrich Oestreich, Munich, all of Fed. Rep. of Germany

[73] Assignee: Siemens Aktiengesellschaft, Berlin and Munich, Fed. Rep. of Germany

[21] Appl. No.: 687,172

[22] Filed: Dec. 28, 1984

[30] Foreign Application Priority Data

Jan. 4, 1984 [DE] Fed. Rep. of Germany ....... 3400202

[51] Int. Cl.⁴ .............................................. G02B 6/04
[52] U.S. Cl. .............................. 350/96.23; 174/120 C
[58] Field of Search ................. 350/96.23; 174/120 R, 174/120 C, 120 SP

[56] References Cited

U.S. PATENT DOCUMENTS 4,514,036 4/1985 McDonald ...................... 350/96.23

FOREIGN PATENT DOCUMENTS 0051922 5/1982 European Pat. Off. .
2924495 5/1981 Fed. Rep. of Germany .

Primary Examiner—Eugene R. LaRoche
Assistant Examiner—James C. Lee
Attorney, Agent, or Firm—Hill, Van Santen, Steadman & Simpson

[57] ABSTRACT

An improved cable having a cable core received in an outside jacket characterized by a wax layer being deposited on the outside jacket to improve the gliding properties of the jacket. The wax layer can be provided from either a solution of the wax or from melted wax in container and preferably is applied subsequent to the extrusion of the outside jacket onto the cable core.

16 Claims, 2 Drawing Figures

CABLE WITH A FRICTION REDUCING OUTSIDE LAYER

BACKGROUND OF THE INVENTION

The present invention is directed to a cable having an outer jacket on which a layer is provided for reducing friction of the cable.

It is known from the German OS No. 29 24 495 to provide a glide or slide layer of fluoropolymer particles on the outside jacket of a cable. This is achieved in that the actual jacket layer is subjected to a sintering process wherein the already low frictional resistance provided by the fluoropolymers is additionally reduced in that outwardly situated small particles of a glide layer produce a structural effect comparable to loose clippings or gravel on a hard surface. However, a precondition for achieving the desirable properties is that the outside jacket of the cable must have a correct composition, i.e., it is a composition consisting of fluoropolymers. It is also necessary to execute the sintering by means of a separate operation and to thereby additionally improve the gliding properties based on the abrasion of extremely fine particles.

From the printed European patent application No. A2 00 51 922, it is known to extrude a second layer onto an outside jacket of a cable with this second layer consisting of a material which noticeably reduces the frictional losses relative to the original, that is, the inner jacket. An additional adhesive intermediate layer is necessary in order to connect the two outside jackets to one another. The outer layer normally consists of a polypropylene or of a hard polyethylene (MDPE, HDPE). However, with the application of a double outside jacket, difficulties will arise because of an undesirable increase in the overall diameter of the cable will occur due to the second or outer layer because this layer cannot be applied with an arbitrarily thin thickness in the extrusion process.

SUMMARY OF THE INVENTION

The present invention is directed to providing a cable having an outer jacket which cable is provided with a glide layer that is in an especially simple and inexpensive fashion such that the outside cable diameter is practically not enlarged. This object is achieved in a cable having an outside jacket with the improvement comprising layer means providing a reduction of friction for the outside jacket wherein the layer means consist of a layer of wax having a good adhesion to the outside jacket.

The application of the wax can be executed in a particularly simple fashion because no additional sintering or extrusion processes are required in contrast to the above-mentioned prior art cables. It is normally sufficient to have the cable provided with the outer jacket being passed through a sponge that is saturated with a wax solution. The wax layer itself can be kept very thin as a wax film which has a layer thickness in the micrometer range, with an adequate thickness being preferably between 2 and 30 $\mu$m.

The wax solution itself expediently uses chemical substances which include polyethylene (PE) hard wax which provide a good and durable adhesion to the cable jacket. This polyethylene hard wax (for instance, Polyethylene-Wax "from Hoechst", softening temp. 50° C.)(Address: Hoechst A. G., Gersthofen, 89 Augsbury 1) is dissolved a mineral varnish having a flash point of 49° C. or in chloride hydrocarbon such as, for example, methylene chloride, or 1,1,1-trichloroethylene. The solution ratio preferably lies between 100:10.

A particularly low coefficient of friction can be achieved when the wax solution has additives in the form of silicones added to it. Additional additives for good weather resistance, for example, both resistance to oxidation and to ultraviolet radiation, can also be added to the wax solution.

The standard printing or labeling on the outside jacket of the cable continues to remain visible because the solvent evaporates within a short time and leaves a transparent wax layer on the jacket.

The invention also relates to a method for coating the outside jacket of the cable which method is characterized in that the application of the wax layer is undertaken immediately subsequent to the extrusion of the outside jacket onto the cable core. The method has the advantage that practically no additional work step is required because the application of the wax in this case can be simply executed along the guidance and movement events that are already required for extruding the outer jacket onto the cable core.

DESCRIPTION OF THE PREFERRED EMBODIMENTS

Figure 1:
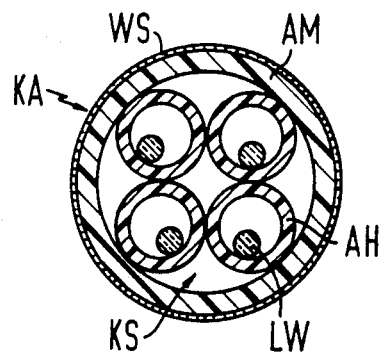
FIG. 1 is a cross-sectional view of a cable coated with a wax layer in accordance with the present invention.

The principles of the present invention are particularly useful in preparing an improved cable KA which is illustrated in FIG. 1. The cable KA as illustrated in FIG. 1 has a cable core KS consisting of four light waveguides LW, each provided with an outside sheath AH. Instead of an optical transmission element or in addition thereto, electrical conductors can also be provided in the region of the cable core KS, which conductors enable a message transmission or emergency transmission. The construction of the cable core KS can include a filling compound for achieving longitudinal tightness as well as other conditions. These will insure that the cable has the desired standard. At least one outside cable jacket AM which preferably consists of a polyethylene or polypropylene material is provided for the protection of the cable core KS. A very thin wax layer WS, whose thickness amounts to a few $\mu$m depending on the concentration of the wax solution is situated on the exterior surface of the outside jacket AM. As a consequence of this small thickness for the layer WS, the diameter of the overall cable KA is practically not enlarged as a result of the application of the wax layer WS. The particularly effective reduction of the friction factor by the cooling or wax layer WS is achieved during a simple working step of drawing the cable, for example, into pipes, leads-through or the like. Great laying lengths are thus possible in actual practice.

Figure 2:
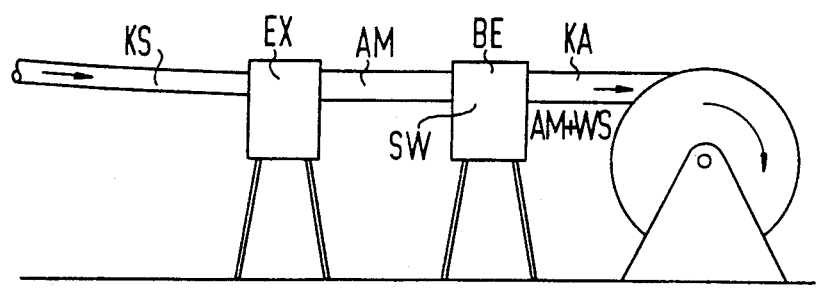
FIG. 2 is a schematic illustration of an apparatus for making the cable of the present invention.

The coating process for applying the wax layer WS is shown in a schematic fashion given an apparatus illustrated in FIG. 2. A cable core KS is supplied to an extruder EX, which applies the outside jacket AM onto the core. The cable, which is still warm, traverses a sponge SW situated in the basin BE and the sponge is continuously saturated with the wax solution. The sponge SW encompasses the jacket MA on all sides and thus produces a uniform coating.

It is also possible to accommodate the wax solution or, respectively, an amount of melted wax, in the basin and to provide a stripper at the output thereof. The stripper will define the layer thickness of the coating of the wax applied to the outer jacket.

Although various minor modifications may be suggested by those versed in the art, it should be understood that we wish to embody within the scope of the patent granted hereon, all such modifications as reasonably and properly come within the scope of our contribution to the art.

We claim:

1. In a cable having an outside jacket, the improvement comprising layer means for reducing the friction on the surface of the outside jacket, said layer means consisting of a wax layer having a good adhesion to the outside jacket, said wax layer having a thickness of only a few $\mu$m and being formed from a wax solution.

2. In a cable according to claim 1, wherein the wax layer chemically comprises a polyethylene hard wax.

3. In a cable according to claim 2, wherein the wax layer includes additives in the form of silicone which serve for the reduction of friction.

4. In a cable according to claim 2, wherein said wax layer also includes an additive to improve the weather-resistance of the layer.

5. In a cable according to claim 2, wherein the wax layer is transparent.

6. In a cable according to claim 1, wherein the wax layer includes polyethylene hard waxes.

7. In a cable according to claim 6, wherein the wax layer is transparent and includes an additive in the form of silicones to help reduce the coefficient of friction.

8. In a cable according to claim 7, wherein said wax layer has additives for improving the weather-resistance of the wax layer.

9. In a cable according to claim 6, wherein said wax layer has additives for improving the weather-resistance of the wax layer.

10. A method of providing an outside cable jacket of a cable with a thin wax layer comprising the steps of extruding the outside jacket onto the cable core to form the cable and subsequently applying the wax layer onto the extruded outside jacket, said wax layer being a thin layer with a thickness of a few $\mu$m.

11. A method according to claim 10, wherein the step of applying the wax layer includes providing the wax in a wax solution and contacting the extruded outside jacket with the wax solution.

12. A method according to claim 11, wherein the step of contacting includes conducting the cable with the extruded outside jacket over a sponge saturated with the wax solution.

13. A method according to claim 10, wherein the step applying a wax layer comprises providing a container of melted wax and contacting the surface of the extruded outside jacket with the melted wax.

14. A method according to claim 10, wherein the step of extruding the outside jacket extrudes a single layer.

15. In a cable having an outside jacket of a single layer, the improvment comprising layer means for reducing the friction on the surface of the outside jacket, said layer means consisting of a wax layer having a good adhesion to the outside jacket, said wax layer being formed from a wax solution and having a thickness of only a few $\mu$m.

16. In a cable according to claim 15, wherein the wax layer comprises polyethylene hard waxes.

* * * * *